(12) United States Patent
Hemmelmann et al.

(10) Patent No.: US 7,804,215 B2
(45) Date of Patent: Sep. 28, 2010

(54) INTEGRATED COOLING CONCEPT FOR MAGNETICALLY GEARED MACHINE

(75) Inventors: Jan Erich Hemmelmann, Bavaria (DE); Michal Wolfgang Waszak, Bavaria (DE)

(73) Assignee: General Electric Company, Niskayuna, NY (US)

( * ) Notice: Subject to any disclaimer, the term of this patent is extended or adjusted under 35 U.S.C. 154(b) by 116 days.

(21) Appl. No.: 12/241,176

(22) Filed: Sep. 30, 2008

(65) Prior Publication Data

US 2010/0079016 A1    Apr. 1, 2010

(51) Int. Cl.
    *H02K 5/10*    (2006.01)
(52) U.S. Cl. ............................ 310/104; 310/86; 310/52
(58) Field of Classification Search ............. 310/52, 310/54, 85–88, 92, 103–105
    See application file for complete search history.

(56) References Cited

U.S. PATENT DOCUMENTS

| | | | | |
|---|---|---|---|---|
| 3,487,457 A | * | 12/1969 | Drouard et al. | 310/86 |
| 4,197,474 A | * | 4/1980 | Honigsbaum | 310/104 |
| 4,396,849 A | * | 8/1983 | Taiani | 310/92 |
| 4,896,064 A | * | 1/1990 | Taiani | 310/104 |
| 4,900,959 A | * | 2/1990 | Drinkut et al. | 310/68 D |
| 5,828,148 A | * | 10/1998 | Niggemann et al. | 310/86 |
| 6,700,236 B2 | | 3/2004 | Umeda et al. | |
| 6,798,097 B2 | | 9/2004 | Pullen et al. | |
| 7,308,795 B2 | | 12/2007 | Hall et al. | |
| 2004/0084977 A1 | | 5/2004 | Devine | |
| 2005/0057111 A1 | * | 3/2005 | Han et al. | 310/166 |
| 2005/0067909 A1 | * | 3/2005 | Ahn et al. | 310/179 |
| 2007/0186692 A1 | | 8/2007 | Waszak et al. | |

FOREIGN PATENT DOCUMENTS

| | | |
|---|---|---|
| EP | 0976917 B1 | 9/2005 |
| GB | 1472571 A | 5/1977 |
| GB | 2326983 A | 1/1999 |

* cited by examiner

*Primary Examiner*—Thanh Lam
(74) *Attorney, Agent, or Firm*—Patrick K. Patnode (57) ABSTRACT

A magnetically geared machine having an integrated cooling concept is provided. The machine includes a rotor having an inner surface and an outer surface, a magnet assembly coupled to one of the inner or outer surfaces of the rotor, and a stator having a plurality of stator windings. The machine further includes a magnetic flux modulator interposed between the rotor and the plurality of stator windings, where the flux modulator includes a plurality of magnetically conductive portions and a plurality of non-magnetically conductive portions placed alternately, where one or more of the plurality of non-magnetically conductive portions comprise a channel for a cooling fluid.

25 Claims, 8 Drawing Sheets

INTEGRATED COOLING CONCEPT FOR MAGNETICALLY GEARED MACHINE

BACKGROUND

Embodiments of the invention relate to a magnetically geared machine, such as motors and generators, and more particularly, to a magnetically geared machine having a cooling concept integrated therein.

Electrical machines (e.g., motors, generators) typically deliver more power at high speeds than at low speeds. In order to adapt a high-speed, rotating electrical machine to a high-torque, lower speed mechanical component (e.g., a prime mover in the case of a generator and a load in the case of a motor), mechanical gear boxes are extensively used, as the cost of having a high-speed electrical machine coupled with corresponding mechanical gearing for speed/torque conversion is lower than that for a low-speed electrical machine. Certain disadvantages are inherent with mechanical gearing such as, for example, acoustic noise, vibration, reliability and the need for lubrication and maintenance, to name a few.

In conventional electromagnetic machines having mechanical gearing, the cooling is an essential aspect for the functionality of the machine. However, due to the limitations in the design of conventional electromagnetic machines, it is only possible to use the mechanical gap between moving part and stationary part of the machine. In some electromagnetic machines air or other cooling medium is distributed through the gap to carry away the undesired heat from the magnetic active parts. Although it is desirable to have a large or broad air gap for cooling purposes, for proper functioning of the machine, it is desirable to have a small mechanical gap. Also, typically only air is used as cooling medium in such systems. Air has a relatively low heat carrying capacity compared to other fluids.

Accordingly, it is desirable to have an electrical machine that has provision for cooling purposes.

BRIEF DESCRIPTION

In accordance with one aspect of the present technique, a magnetically geared machine having an integrated cooling concept is provided. The machine includes a rotor having an inner surface and an outer surface, a magnet assembly coupled to one of the inner or outer surfaces of the rotor, and a stator having a plurality of stator windings. The machine further includes a magnetic flux modulator interposed between the rotor and the plurality of stator windings, where the flux modulator includes a plurality of magnetically conductive portions and a plurality of non-magnetically conductive portions placed alternately, where one or more of the plurality of non-magnetically conductive portions comprise a channel for a cooling fluid.

In accordance with another aspect of the present technique, a magnetically geared machine having an integrated cooling concept is provided. The machine includes a moveable rotor having a first magnetic field associated therewith, a magnet assembly coupled to the moveable rotor, and a stator having a plurality of stationary stator windings. The machine further includes a magnetic flux modulator interposed between the moveable rotor and the stator windings, where the flux modulator is configured to provide a plurality of passageways proximate to a plurality of magnetically conductive portions of the flux modulator layer, and where at least one of the plurality of passageways comprises a cooling fluid.

In accordance with yet another aspect of the present technique, a generator system is provided. The generator system includes a generator coupled to a turbine, and a tower connected to the generator. The generator includes a permanent magnet rotor coupled to the turbine, the rotor having a first magnetic field associated therewith, a stator configured with a plurality of stationary stator windings therein, and a magnetic flux modulator interposed between the moveable rotor and the stator windings, where the flux modulator comprises a plurality of magnetically conductive portions and a plurality of non-magnetically conductive portions placed alternately, and where one or more of the plurality of non-magnetically conductive portions comprise a channel for a cooling fluid.

In accordance with another aspect of the present technique, a propulsion system is provided. The propulsion system includes a propulsion motor configured to rotate a shaft. The propulsion motor includes a permanent magnet rotor coupled to the shaft, where the rotor includes a first magnetic field associated therewith. The propulsion motor further includes a stator configured with a plurality of stationary stator windings therein, and a magnetic flux modulator interposed between the moveable rotor and the stator windings, where the flux modulator comprises a plurality of magnetically conductive portions and a plurality of non-magnetically conductive portions placed alternately, and where one or more of the plurality of non-magnetically conductive portions comprise a channel for a cooling fluid, and a propeller coupled to the shaft.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique provide a magnetically geared machine having an integrated cooling concept. The magnetically geared machine may be employed in an electrical machine apparatus, such as motors, generators. The magnetically geared machine includes a rotor having an inner surface and an outer surface. A magnet assembly may be coupled to either the inner surface or the outer surface of the rotor. In embodiments where the rotor is a moveable rotor, the magnet assembly may be coupled to the inner surface of the rotor. Whereas, in embodiments where the rotor is a stationary rotor, the magnet assembly may be coupled to the outer surface of the rotor. In case of a circular electric machine configuration, the rotor may be configured to rotate about an axis of rotation. In case of a linear electric machine configuration, the rotor is configured to move laterally. The magnetically geared machine includes a stator that has a plurality of stator windings.

In certain embodiments, the magnetically geared machine includes a magnetic flux modulator, which modulator is interposed between the rotor and the plurality of stator windings. The magnetic flux modulator is configured to address cooling requirements of the magnetically geared machine. For example, the magnetic flux modulator may provide cooling to one or more of the plurality of stator windings. In addition, the magnetic flux modulator may be configured to transmit torque between a first magnetic field associated with the rotor and a second magnetic field excited by the plurality of stator windings. In one embodiment, the flux modulator layer in part or as a whole may be coupled to a frame supporting the stator. The flux modulator includes a plurality of magnetically conductive portions and a plurality of non-magnetically conductive portions that are placed alternately. In some embodiments, one or more of the plurality of non-magnetically conductive portions may include a channel for a cooling fluid. The channels may be present in all or some of the non-magnetically conductive portions.

Figure 1:
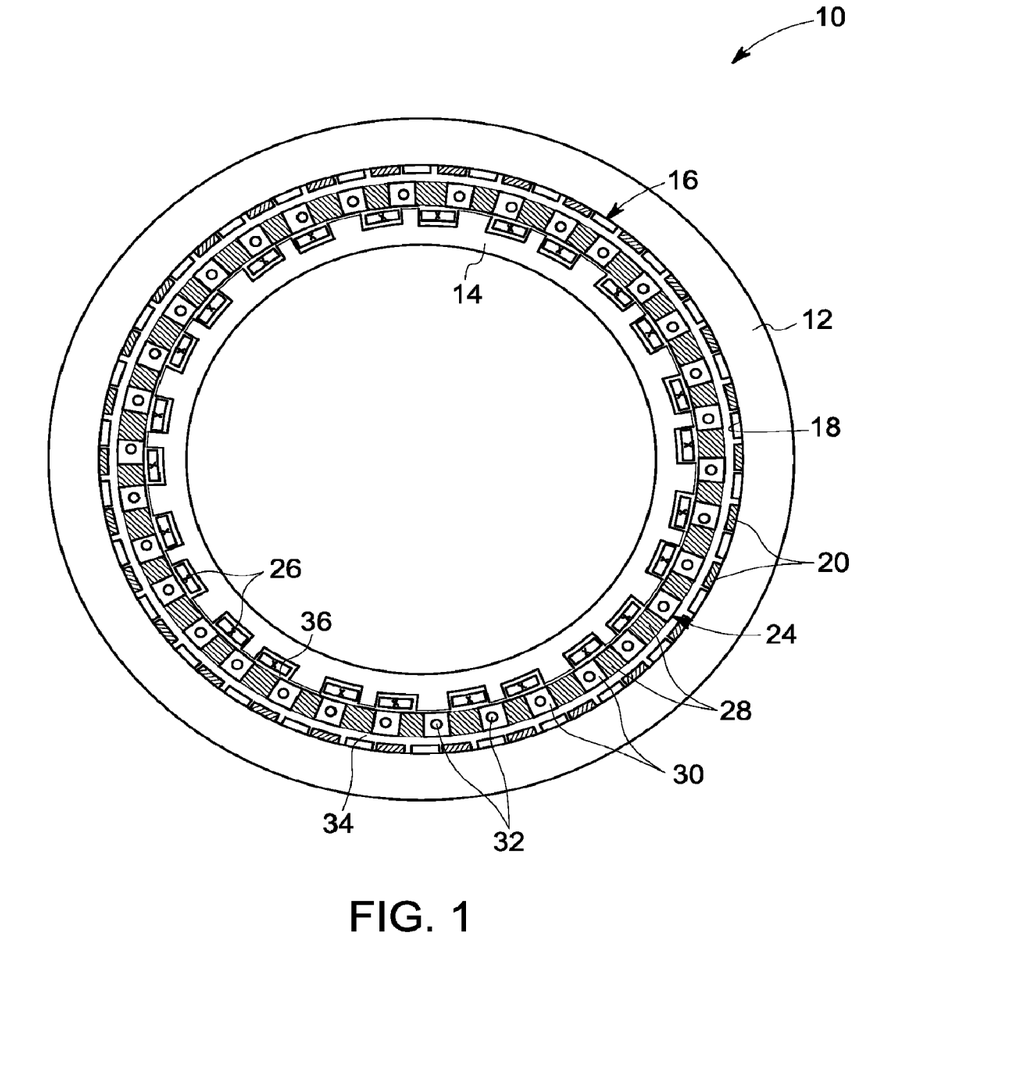
FIG. 1 is a cross sectional view of an electrical machine apparatus employing the flux, in accordance with embodiments of the present technique.
Figure 2:
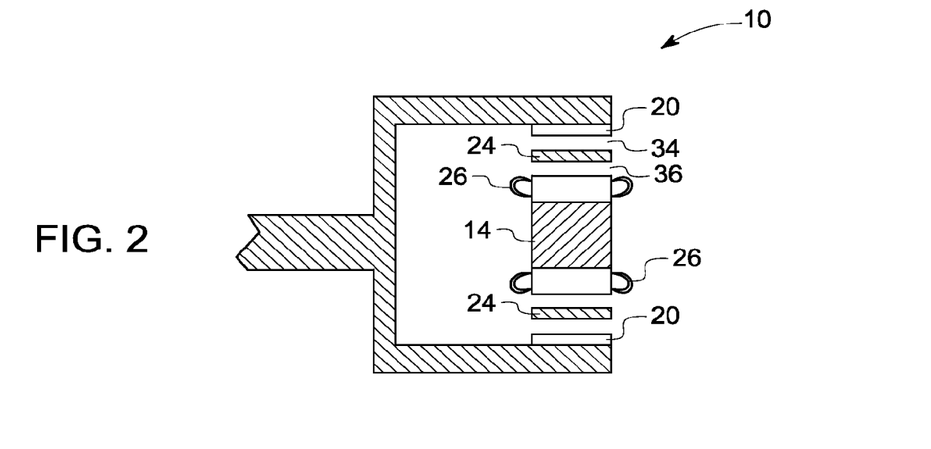
FIG. 2 is a side cross sectional view of the electrical machine apparatus of FIG. 1.

FIGS. 1 and 2 illustrate an electrical machine apparatus 10 having magnetic gearing with an integrated cooling concept. In the illustrated embodiment, the machine apparatus 10 includes a moveable rotor 12 that is outwardly disposed with respect to a stator 14. The rotor 12 includes a magnet assembly 16 disposed on an inner surface 18 of the rotor. The magnet assembly 16 includes a plurality of permanent magnets 20 of magnetically alternating orientation. In some embodiments, each of the plurality of permanent magnets 20 may be coupled to the moveable rotor 12.

Further, the machine 10 employs a magnetic flux modulator 24 that provides cooling to at least a portion of the machine 10. In addition to providing cooling, the flux modulator layer also facilitates torque transmission between the magnetic field excited by the rotor 12 and the magnetic fields excited by stator windings 26 disposed on the stator 14. In the presently contemplated embodiment, the flux modulator 24 includes a plurality of magnetically conductive portions 28 and a plurality of non-magnetically conductive portions 30 that are disposed alternately. In some embodiments, the plurality of non-magnetically conductive portions 30 may include one or more of a plastic, a glass fiber, a ceramic material, a composite, a metal, or combinations thereof. In other embodiments, the plurality of non-magnetically conductive portions 30 may include laminated structures made from sheets of non-magnetic material. As used herein, the term "laminated structure" refers to structure made by bonding together two or more layers of material. The two or more layers may be fused together under the effect of one or more of heat, pressure, and adhesives.

One or more of the plurality of non-magnetically conductive portions 30 may include a channel, such as channel 32, for a cooling fluid to primarily facilitate cooling of the magnetically conductive portions 28. In certain embodiments, the cooling fluid may include a liquid, or a gas, or both. Non-limiting examples of the cooling fluid may include water, liquid nitrogen, liquid mercury, methanol, ethanol, oil, gaseous hydrogen, gaseous helium, gaseous nitrogen, gaseous oxygen, air, compressed air, or combinations. The channel 32 may include a bore, or a hole, or a hose, or combinations thereof. In one embodiment, all the channels 32 may include same type of opening. For example, the channels 32 in the non-magnetically conductive portions 30 may all include either a hole, or a bore, or a hose. In another embodiment, the different channels 32 may include different types of openings.

In certain embodiments, the plurality of magnetically conductive portions 28 and/or the plurality of non-magnetically conductive portions 30 of the magnetic flux modulator 24 may include one or more different geometric shapes, such as but not limited to square, oval, trapezoidal, spherical, triangular, rectangular, or rhombus shapes. In one embodiment, the portions 28 and/or 30 may all have the same shape. In another embodiment, the portions 28 and/or 30 may have different shapes. In one embodiment, the plurality of magnetically conductive portions 28 may be embedded into a layer formed from the material of the non-magnetically conductive portions 30, thereby defining the remaining of the portion of layer as the plurality of non-magnetically conductive portions 30. In this embodiment, the layer formed from the material of the non-magnetically conductive portions 30 may be patterned to define gaps to dispose the plurality of magnetically conductive portions 28 to form the magnetic flux modulator 24. In another embodiment, individual pieces of the plurality of non-magnetically conductive portions 30 and the plurality of magnetically conductive portions 28 may be fused or coupled together to form the magnetic flux modulator 24.

In the illustrated embodiment, a first air gap 34 may be present between the flux modulator 24 and the magnet assembly 16. Similarly, a second air gap 36 may be present between the flux modulator 24 and the stator windings 26.

Figure 3:
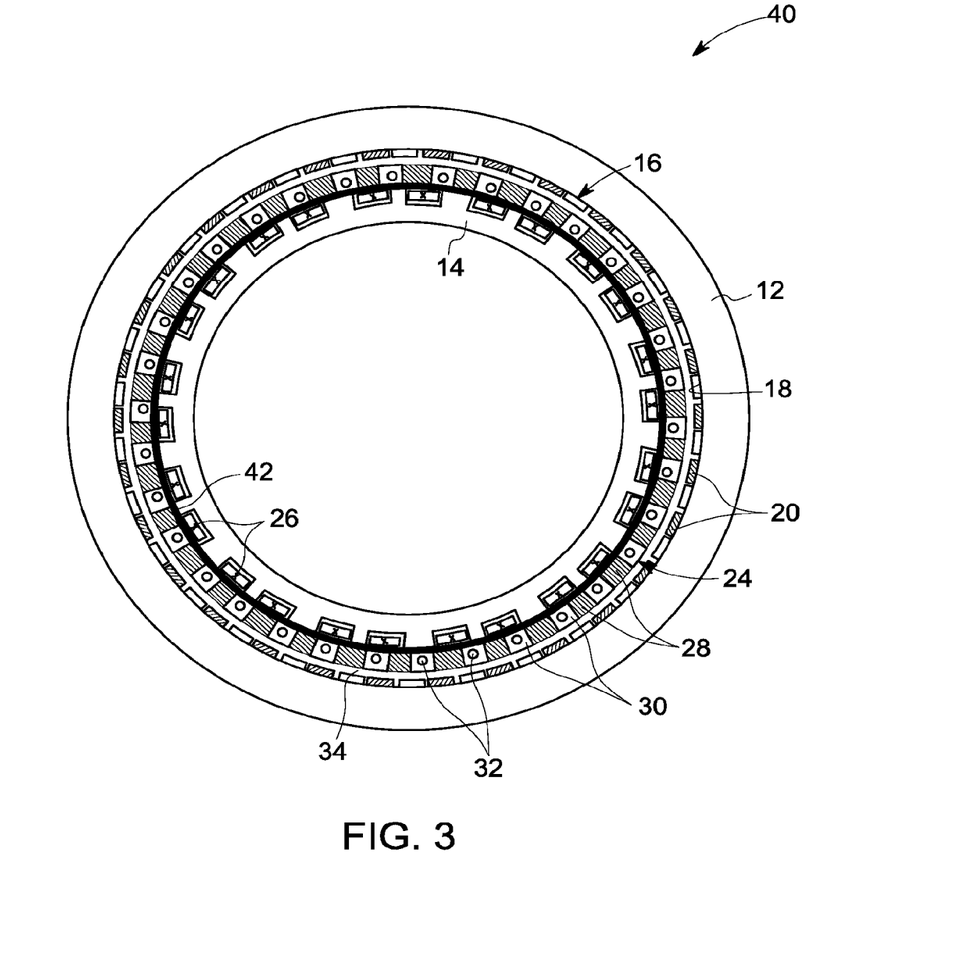
FIG. 3 is cross sectional view of an alternative embodiment of the electrical machine apparatus of FIG. 1.

In an alternate embodiment of the electrical machine apparatus, FIG. 3 illustrates an electrical machine apparatus 40 having a filler layer 42 disposed between the flux modulator 24 and the stator windings 26. The material of the filler layer 42 may or may not be not be present in the grooves 44 that house the stator windings 26. For example, in one embodiment, the material of the filler layer 42 may partially, or completely surround the stator windings 26. In another embodiment, the filler layer 42 may have a planar surface that bridges the grooves 44 without entering into the grooves 44. Regardless of the filler layer 42 having a planar or a non-planar surface, in some embodiments, the filler layer 42 may include passageways (not shown) for a cooling fluid. In these embodiments, the passageway with the cooling fluid may facilitate heat removal from neighboring heat generating elements, such as but not limited to, the stator windings 26. The cooling fluid present in the channels 32 of the flux modulator layer 24 may be the same or different from the cooling fluid present in the passageways of the filler layer 42.

In the presently contemplated embodiment, the material of the filler layer 42 is non-magnetic and electrically insulating in nature. In one embodiment, the filler layer 42 may include a plastic, a glass fiber, a ceramic material, a composite, a metal, a resin, or combinations thereof. In one example, the filler layer 42 comprises an epoxy-based resin. In one embodiment, a portion of the filler layer 42 may include a sacrificial material such that at least a portion of the sacrificial material may be removed when subjected to the heating inside the electrical machine. This removal of the sacrificial material from the portions of the filler layer 42 may form passageways in the filler layer 42 to house cooling fluid.

Figure 4:
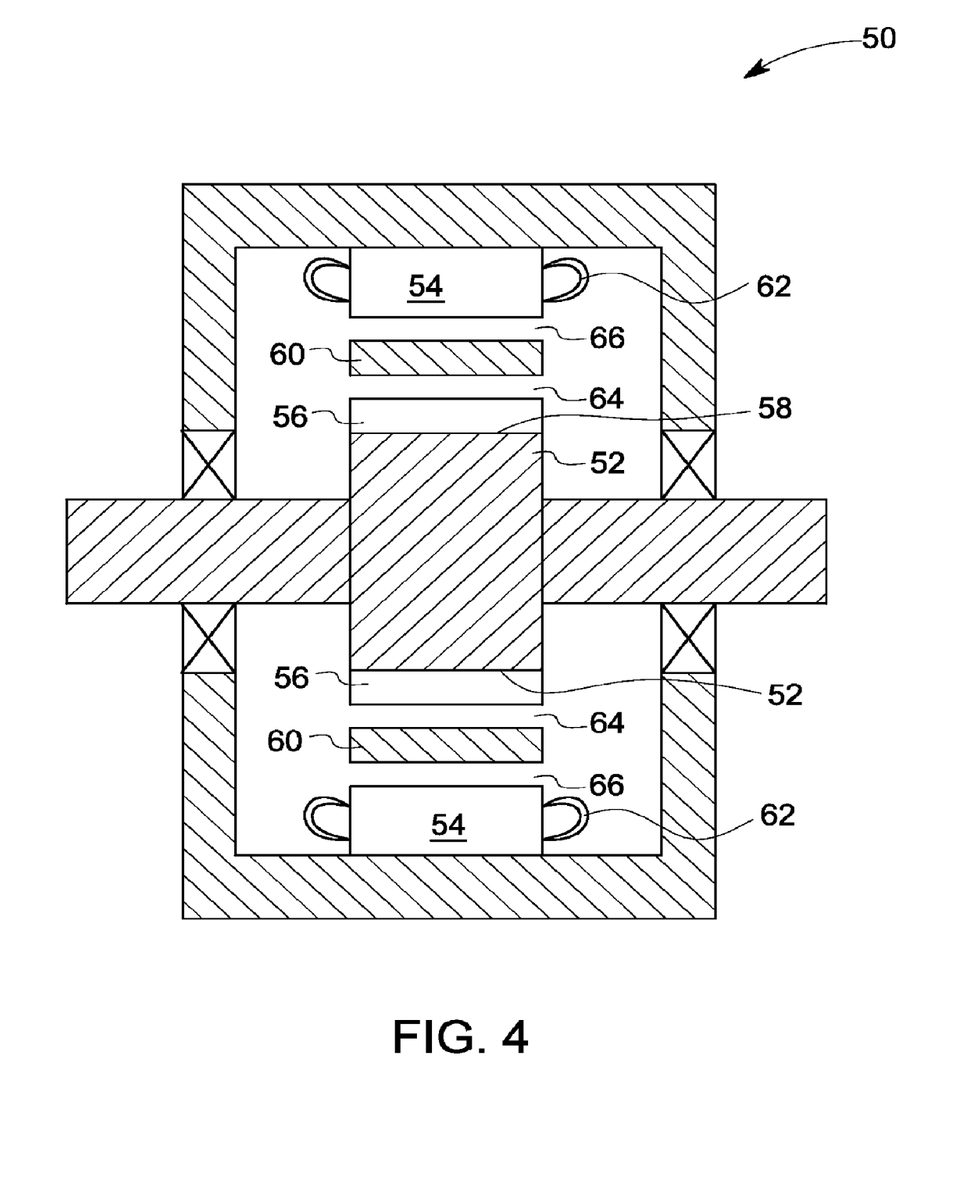
FIG. 4 is side cross sectional view of an alternative embodiment of the electrical machine apparatus of FIGS. 1 and 2.

As indicated above, an outer rotor/inner stator is one possible configuration for the electrical machine apparatus with magnetic gearing. On the other hand, FIG. 4 is an alternative embodiment of an electrical machine apparatus 50 having an inner permanent magnet rotor 52 and an outer stator 54. In this example, the magnet assembly 56 having a plurality of magnets is coupled to an outer surface 58 of the rotor 52. In addition, a magnetic flux modulator 60 having a plurality of magnetically conductive and a plurality of non-magnetically conductive portions is interposed between stationary stator windings 62 and the magnet assembly 56. As with the embodiments illustrated in FIGS. 1-2, there may be a first air gap 64 between the magnet assembly 56 and the flux modulator 60, and/or a second air gap 66 between the flux modulator 60 and the stator windings 62. Although not illustrated, a filler layer may be disposed either in the first air gap 64, or the second air gap 66, or both. Optionally, the filler layer may include one or more passageways for cooling fluid. In one embodiment, the flux modulator layer 60 may be directly attached to the stator 54 using a bonding material, for example. The flux modulator layer 60 may be directly attached to the stator 54 in applications, such as but not limited to, high shaft speed applications, where the number of rotor pole pairs is less than the number of stator pole pairs.

In addition to rotating machines, the integrated cooling concept of the present technique may also be applied to linear electric machines (i.e., motors or generators). Linear generators have been proposed as suitable energy conversion devices for ocean wave energy plants, linear motors for electromagnetic valves for internal combustion engines and compressor valves, or for general high force density transportation purposes, such as machine tools for example. As opposed to a rotor that spins about an axis of rotation, the rotor of a linear electric machine moves laterally back and forth around a center of rotation at an infinite distance. The electromagnetic flux in the air gap of a linear machine is the same as for rotational machinery. FIGS. 5-8 illustrate alternate embodiments of linear electrical machine apparatus having integrated cooling concept.

Figure 5:
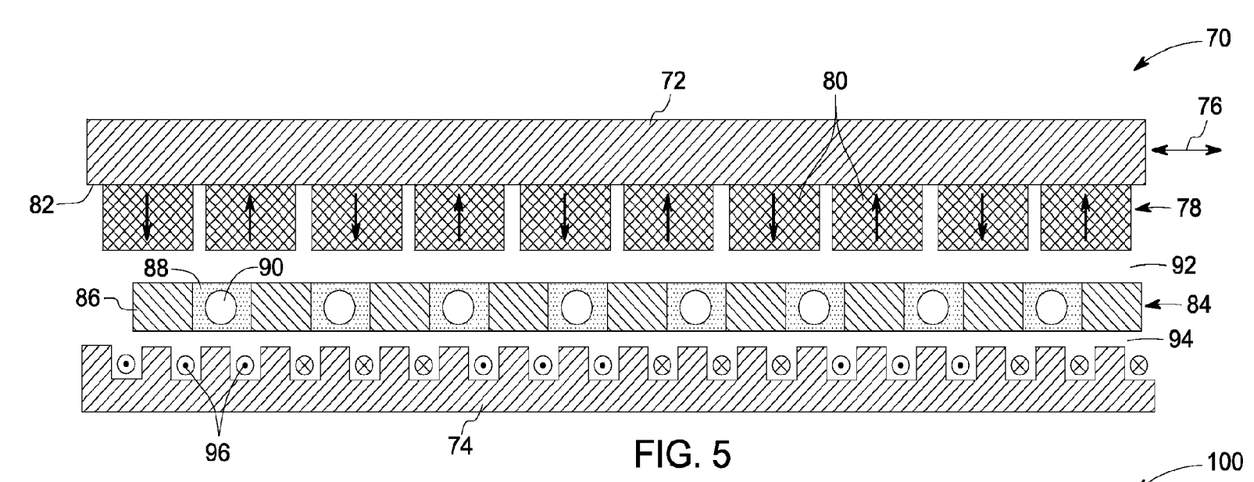
FIGS. 5-8 are side views of alternate embodiments of a flux modulator having integrated cooling concept, in accordance with embodiments of the present technique.

Referring now to FIG. 5, a linear electrical machine 70 includes a linearly movable rotor 72 and a stator 74. A two-way arrow 76 represents the direction of motion of the linear electrical machine 70. In the illustrated embodiment, the magnet assembly 78 includes a plurality of permanent magnets 80 that are disposed in an alternating magnetic orientation on an inner surface 82 of the rotor 72. In the presently contemplated embodiment, the machine 70 includes a magnetic flux modulator 84 having a plurality of magnetically conductive portions 86 and a plurality of non-magnetically conductive portions 88 placed alternately. The one or more of the plurality of non-magnetically conductive portions 88 include channels 90 for a cooling fluid. The linear machine 70 may include a first air gap 92 formed between the permanent magnet assembly 78 and the magnetic flux modulator 84, and/or a second air gap 94 formed between the flux modulator 84 and stator windings 96.

Figure 6:
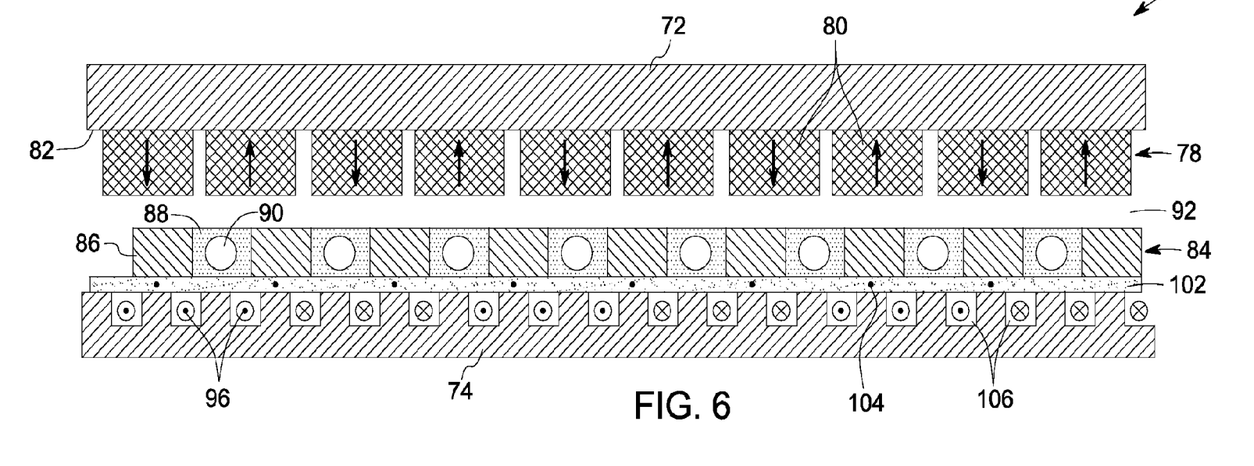

As illustrated in FIG. 6, a linear electrical machine 100 may employ a filler layer 102 in the second air gap 94 of FIG. 5. The filler layer 102 may include one or more passageways 104 for a cooling fluid. The cooling fluid in the passageways 104 may facilitate removal of heat generated in the stator windings 96. In one example, the filler layer 102 may initially include a sacrificial material in the places where the passageways 104 are desired. In this embodiment, the sacrificial material may be configured to be removed when subjected to the heat generated in the linear electrical machine 100, thereby forming passageways 104 during operation of the machine. These passageways 104 may then be filled with the cooling fluid to provide cooling to the stator windings 96. The filler layer 102 may have a planar or a non-planar surface. The filler layer 102 may or may not extend into the grooves 106 housing the stator windings 96.

Figure 7:
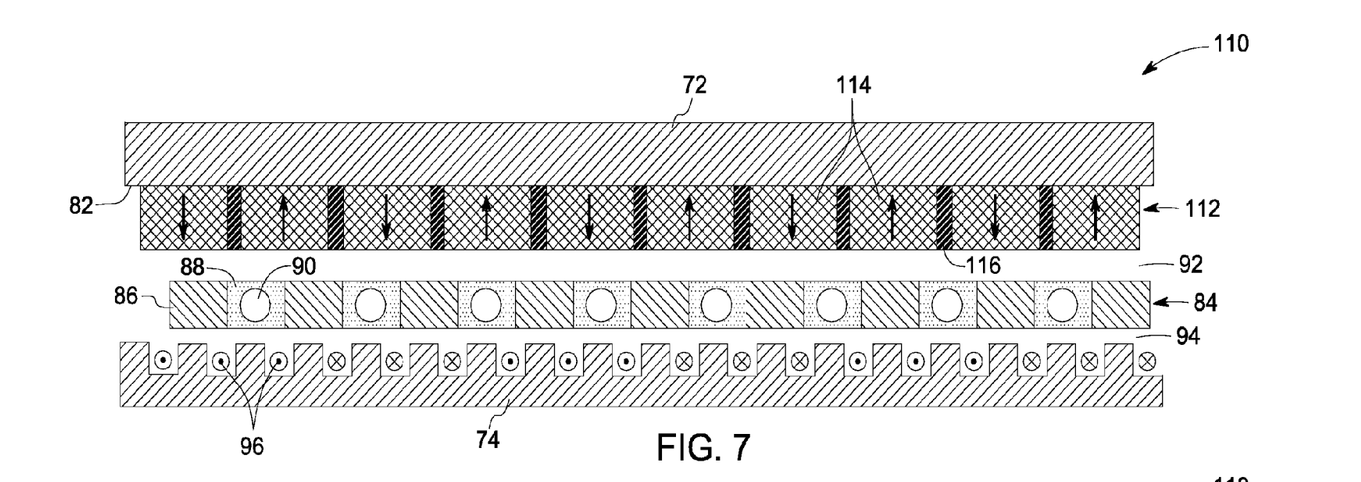

As another alternate embodiment of FIG. 5, a linear electrical machine 110 of FIG. 7 employs a magnet assembly 112 that includes a plurality of magnets 114 embedded in a non-magnetic layer 116. In one embodiment, the non-magnetic layer 116 may include one or both of the fiber-enforced resin, such as epoxy, or a plastic material, such as poly vinyl chloride, polyamide, or polyester. In one embodiment, the magnet assembly 112 may be surface mounted on the inner surface 82 of the rotor 72.

Figure 8:
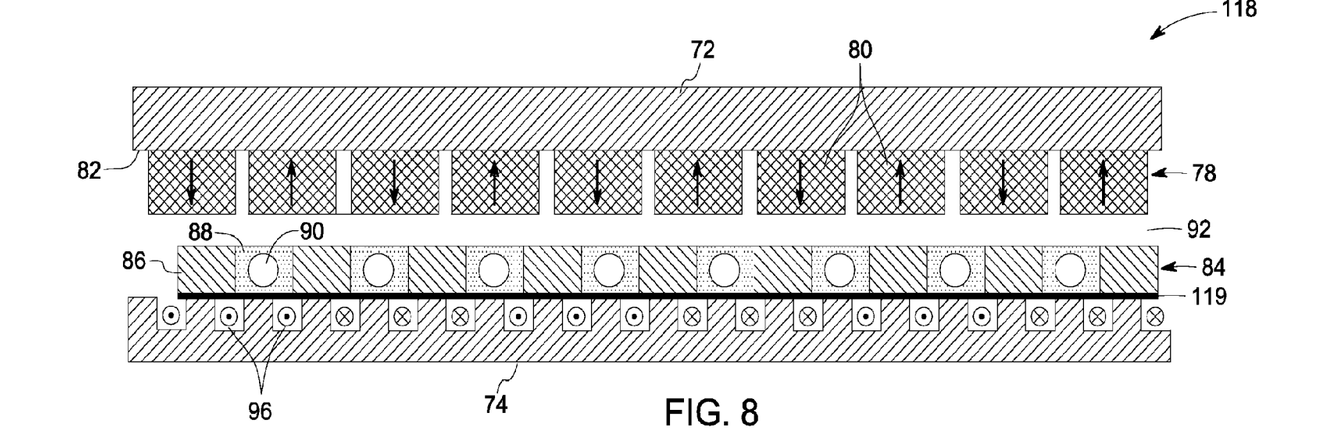

Further, in the illustrated embodiment of FIG. 8, in a linear electrical machine 118 the magnetic flux modulator 84 may be disposed directly on the stator 74. In this embodiment, the second air gap 94 (see FIG. 7) may not exist. Instead, a thin layer 119 of a bonding material, for example, is present between the magnetic flux modulator 84 and the stator 74 to facilitate bonding between the surfaces of the magnetic flux modulator 84 and the stator 74. In one example, the bonding material may include an epoxy-based resin.

In the various embodiments depicted above, the rotors of the electrical machines are implemented with permanent magnet rotors. However, it is also contemplated that the integrated magnetic gearing may also be accomplished through the use of rotors having wound field, squirrel cage, or switched reluctance poles. In other words, the rotor's magnetic field may be implemented through DC powered electromagnets, in lieu of permanent magnets.

Although the winding configurations specifically illustrated in FIGS. 1-8 depict three-phase windings, it should also be understood that a different number of phases may be used as well.

Figure 9:
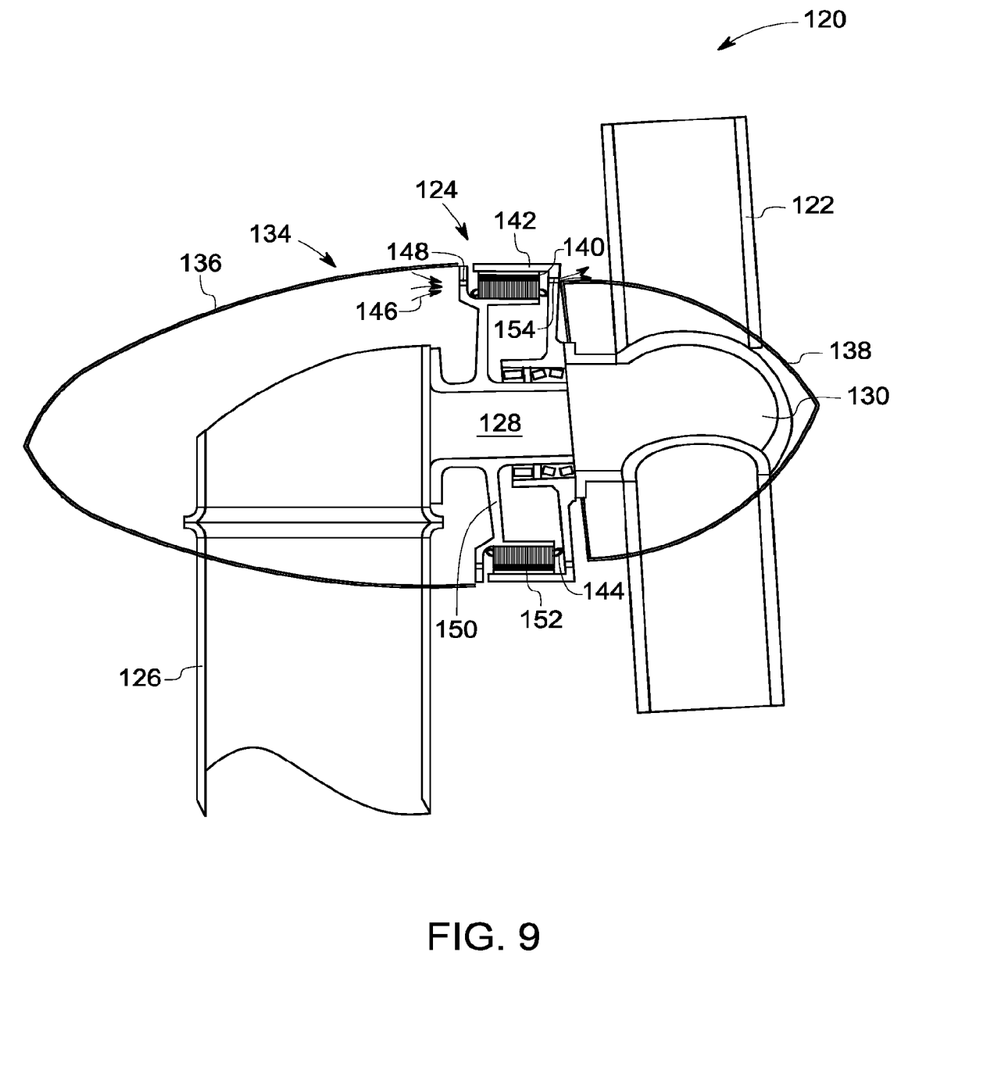
FIG. 9 is a side cross sectional view of a wind turbine generator system utilizing high torque density magnetic gearing integrated therein, in accordance with another embodiment of the technique.
Figure 10:
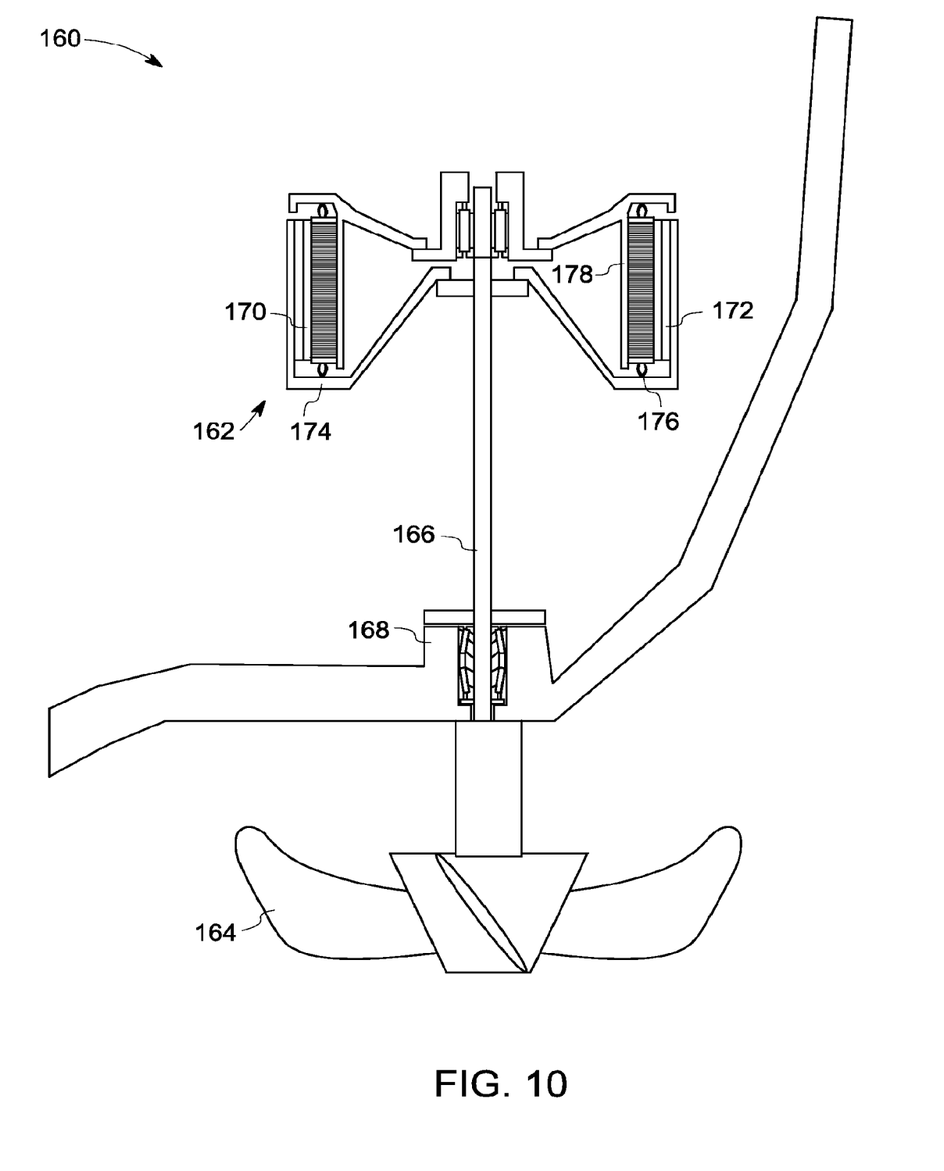
FIG. 10 is a side cross sectional view of a ship propulsion system and motor utilizing high torque density magnetic gearing integrated therein, in accordance with another embodiment of the technique.

FIGS. 9 and 10 illustrate exemplary applications for one or more of the electrical machine embodiments described herein. For instance, FIG. 9 is a side cross sectional view of a wind turbine generator system 120 utilizing an integrated cooling concept of the present technique. Although not illustrated, the generator system 120 employing the integrated cooling concept may also be employed in steam turbine. The system 120 includes a wind driven turbine 122, wind turbine generator 124, and tower 126. In the illustrated embodiment, the blades of the turbine 122 are attached to a main shaft and bearing assembly 128 through a rotor blade hub 130. A main frame 132 of nacelle 134 is attached to the main shaft assembly 128 and sits atop the tower 126. A nacelle cover 136 protects the components inside the nacelle 134, while a rotor hub cover 138 protects the rotor blade hub 130.

In the presently contemplated embodiment, the turbine generator 124 incorporates the integrated cooling concept through a magnetic flux modulator 140 between the permanent magnet rotor 142 and the stator windings 144. In an exemplary embodiment, the generator 124 includes 88 rotor pole pairs, 8 stator pole pairs and 96 plurality of magnetically conductive portions in the flux modulator 140 to yield a 11:1 gear ratio. Other gear ratios, however, are also contemplated.

Cooling of the turbine generator 124 may be accomplished by circulation of air 146 through holes 148 within the stator frame 150, passing through the air gap between the magnet assembly 152 of the rotor 142 and the stator windings 144, and out through holes 154 in the rotor 142. The cooling air path could also be run in the reverse direction.

Referring now to FIG. 10, a motor application for the integrated cooling concept is illustrated. In the illustrated embodiment, a ship propulsion system 160 including an inboard propulsion motor 162 used to drive an outboard propeller 164 through rotation of a shaft 166 secured by a mounting and bearing assembly 168. Again, the propulsion motor 162 provides direct drive through the use of the flux modulator 170 configured to provide high torque transmission and cooling positioned between the magnet assembly 172 of the rotor 174 and the stator windings 176 of the stator 178.

Figure 11:
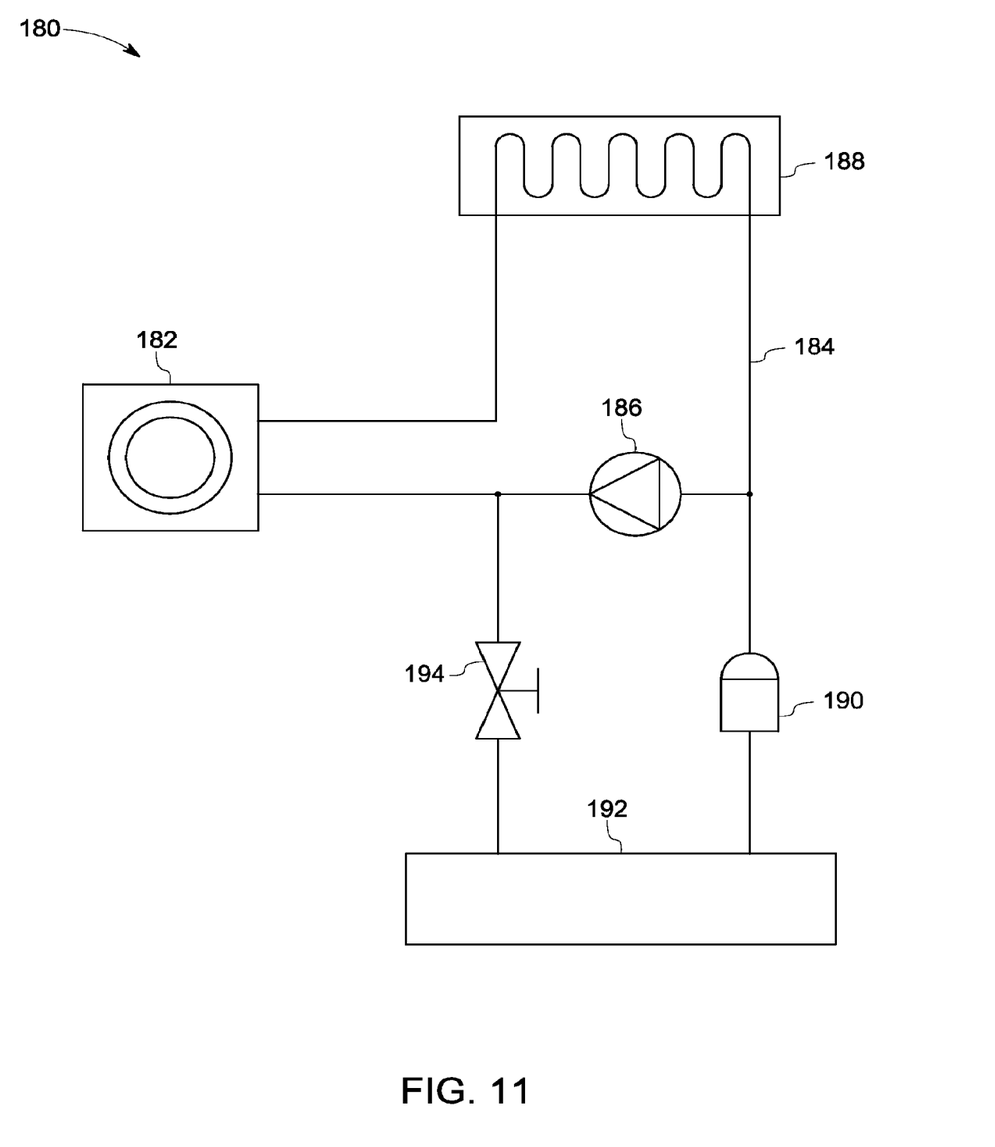
FIG. 11 is a schematic of an example of a cooling circuit for use in the magnetically geared machine, in accordance with embodiments of the present technique.

FIG. 11 illustrates an example of a cooling circuit 180 that may be employed in conjunction with a magnetically geared machine 182 having the integrated cooling concept of the present technique. In the illustrated embodiment, the cooling circuit 180 includes a flow path 184 for circulating the cooling medium of the magnetic flux modulator (not shown) of the integrated cooling concept to provide cooling in the magnetically geared machine 182. In the presently contemplated embodiment, the cooling circuit 180 employs a pump 186 to drive the cooling medium through the flow path 184. A heat exchanger 188 is employed to at least partially remove the thermal energy of the cooling medium into the environment.

Additionally, a filtration device 190 may be provided in the cooling circuit 180 to filter the cooling medium before returning the cooling medium to the machine 182. For example, the filtration device 190 may be provided to prevent clogging in the cooling circuit 180. Depending on the degree of contamination of the cooling medium caused during operation of the magnetically geared machine 182, the cooling medium may or may not be passed through the filtration device 190. In one embodiment where the contamination of the cooling medium is low, the cooling medium may be directly returned to the magnetically geared machine 182 after removing at least a portion of the heat from the cooling medium using the heat exchanger 188, without passing the cooling medium through the filtration device 190.

The cooling circuit 180 may also include a reservoir 192 to pump in additional cooling medium in the cooling circuit 180, if desirable. For example, additional cooling medium from the reservoir may be pumped into the magnetically geared machine 182 to at least partially compensate for the loss of the cooling medium during filtration in the filtration device 190. Also, an overpressure relief valve 194 may be employed to secure the machine 182 from over pressure of the cooling medium.

It should be noted that the cooling circuit of FIG. 11 may be modified in several fashions depending on the cooling requirements of the system. For example, additional devices, such as pumps, valves, filtration devices and the like may be employed in the cooling circuit. Also the relative position of these individual devices may be altered depending on the cooling requirements of the system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A magnetically geared machine having an integrated cooling concept, the machine comprising:
   a rotor having an inner surface and an outer surface;
   a magnet assembly coupled to one of the inner or outer surfaces of the rotor;
   a stator having a plurality of stator windings; and
   a magnetic flux modulator interposed between the rotor and the plurality of stator windings, wherein the flux modulator comprises a plurality of magnetically conductive portions and a plurality of non-magnetically conductive portions placed alternately, and wherein one or more of the plurality of non-magnetically conductive portions comprise a channel for a cooling fluid.

2. The magnetically geared machine of claim 1, wherein the cooling fluid comprises a liquid, or a gas, or both.

3. The magnetically geared machine of claim 1, wherein the cooling fluid comprises water, liquid nitrogen, liquid mercury, methanol, ethanol, oil, gaseous hydrogen, gaseous helium, gaseous nitrogen, gaseous oxygen, air, compressed air, or combinations thereof.

4. The magnetically geared machine of claim 1, wherein the one or more of the plurality of non-magnetically conductive portions comprise a plastic, a glass fiber, a ceramic material, a composite, a metal, or combinations thereof.

5. The magnetically geared machine of claim 1, wherein the channel comprises a bore, or a hole, or a hose, or combinations thereof.

6. The magnetically geared machine of claim 1, further comprising a filler layer disposed between the magnetic flux modulator and stator windings.

7. The magnetically geared machine of claim 6, wherein the filler layer comprises at least one channel for the cooling fluid.

8. The magnetically geared machine of claim 6, wherein the filler layer comprises a plastic, a glass fiber, a ceramic material, a composite, a metal, a resin, or combinations thereof.

9. The magnetically geared machine of claim 6, wherein the filler layer comprises an epoxy-based resin.

10. The magnetically geared machine of claim 1, wherein at least a portion of the filler layer comprises a sacrificial material.

11. The magnetically geared machine of claim 1, wherein the magnet assembly comprises a plurality of individual permanent magnets coupled to the rotor.

12. The magnetically geared machine of claim 1, wherein the magnet assembly comprises one or more permanent magnet blocks embedded in a non-magnetic layer.

13. The magnetically geared machine of claim 12, wherein the non-magnetic layer comprises fiber-enforced resin, or a plastic material, or both.

14. The magnetically geared machine of claim 1, comprising an air gap disposed between the stator windings and the flux modulator layer.

15. The magnetically geared machine of claim 1, comprising an air gap disposed between the magnet assembly and the flux modulator layer.

16. The magnetically geared machine of claim 1, wherein the flux modulator in part or as a whole is coupled to a frame supporting the stator.

17. The magnetically geared machine of claim 1, wherein the magnetic flux modulator is configured to transmit torque between a first magnetic field associated with the moveable rotor and a second magnetic field excited by the plurality of stationary stator windings.

18. The magnetically geared machine of claim 1, wherein the rotor is configured to rotate about an axis of rotation, and the stator is outwardly disposed from the axis of rotation with respect to the rotor.

19. The magnetically geared machine of claim 18, wherein the rotor comprises a high speed rotor with respect to a low speed variation of the second magnetic field associated with the stator windings.

20. The magnetically geared machine of claim 1, wherein the rotor is configured to move laterally in a linear electric machine configuration.

21. A magnetically geared machine having an integrated cooling concept, the machine comprising:
   a moveable rotor having a first magnetic field associated therewith;

a magnet assembly coupled to the moveable rotor;

a stator having a plurality of stationary stator windings;

a magnetic flux modulator interposed between the moveable rotor and the plurality of stator windings, wherein the flux modulator is configured to provide a plurality of passageways proximate to a plurality of magnetically conductive portions of the flux modulator, and wherein at least one of the plurality of passageways comprises a cooling fluid.

22. A generator system, comprising:

a generator coupled to a turbine; and a tower connected to the generator, the generator further comprising:
- a permanent magnet rotor coupled to the turbine, the rotor having a first magnetic field associated therewith;
- a stator configured with a plurality of stationary stator windings therein; and
- a magnetic flux modulator interposed between the moveable rotor and the stator windings, wherein the flux modulator comprises a plurality of magnetically conductive portions and a plurality of non-magnetically conductive portions placed alternately, wherein one or more of the plurality of non-magnetically conductive portions comprise a channel for a cooling fluid.

23. The generator system of claim 22, wherein the generator system is employed in a wind turbine, or a steam turbine.

24. A propulsion system, comprising:

a propulsion motor configured to rotate a shaft; the propulsion motor comprising:
- a permanent magnet rotor coupled to the shaft, the rotor having a first magnetic field associated therewith;
- a stator configured with a plurality of stationary stator windings therein; and
- a magnetic flux modulator interposed between the moveable rotor and the stator windings, wherein the flux modulator comprises a plurality of magnetically conductive portions and a plurality of non-magnetically conductive portions placed alternately, wherein one or more of the plurality of non-magnetically conductive portions comprise a channel for a cooling fluid;

a propeller coupled to the shaft.

25. The propulsion system of claim 24, wherein the propulsion system is employed in a vessel, or an aircraft.

\* \* \* \* \*

UNITED STATES PATENT AND TRADEMARK OFFICE
CERTIFICATE OF CORRECTION

PATENT NO.         : 7,804,215 B2
APPLICATION NO.    : 12/241176
DATED              : September 28, 2010
INVENTOR(S)        : Hemmelmann et al.

It is certified that error appears in the above-identified patent and that said Letters Patent is hereby corrected as shown below:

On the Title page, item (75), under "Inventors", in Column 1, Line 2,
delete "Michal Wolfgang" and insert -- Michal-Wolfgang --, therefor.

Signed and Sealed this

Seventh Day of December, 2010

David J. Kappos
*Director of the United States Patent and Trademark Office*